United States Patent
Nagano

(10) Patent No.: US 10,698,292 B1
(45) Date of Patent: Jun. 30, 2020

(54) OPTICAL WAVELENGTH CONVERSION DEVICE AND METHOD FOR MANUFACTURING THE SAME

(71) Applicant: Sumitomo Electric Industries, Ltd., Osaka (JP)

(72) Inventor: Shigehiro Nagano, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/708,882

(22) Filed: Dec. 10, 2019

(30) Foreign Application Priority Data

Jan. 9, 2019 (JP) .................................. 2019-002041

(51) Int. Cl.
*G02F 1/355* (2006.01)
*G02F 1/35* (2006.01)
*G02F 1/365* (2006.01)

(52) U.S. Cl.
CPC ............ *G02F 1/3551* (2013.01); *G02F 1/353* (2013.01); *G02F 1/3544* (2013.01); *G02F 1/365* (2013.01); *G02F 2001/3548* (2013.01)

(58) Field of Classification Search
CPC ...... G02F 1/353; G02F 1/3551; G02F 1/3544; G02F 1/365; G02F 2001/3548
See application file for complete search history.

(56) References Cited

U.S. PATENT DOCUMENTS

| 7,170,671 B2* | 1/2007 | Wu ....................... G02F 1/3558 |
| | | 117/3 |
| 7,551,655 B2* | 6/2009 | Tanaka ............... B23K 26/0643 |
| | | 372/25 |

| 2006/0051943 A1* | 3/2006 | Inoue .................. H01L 21/2026 |
| | | 438/487 |
| 2016/0067822 A1* | 3/2016 | Arai ......................... B28D 5/00 |
| | | 156/367 |

(Continued)

FOREIGN PATENT DOCUMENTS

| WO | 2017/110792 A1 | 6/2017 |
| WO | 2018/123110 A1 | 7/2018 |

OTHER PUBLICATIONS

Gattass and Mazur, "Femtosecond Laser Micromachining in Transparent Materials", Nature Photonics, Apr. 2008, pp. 219-225, vol. 2.

(Continued)

*Primary Examiner* — Daniel Petkovsek
(74) *Attorney, Agent, or Firm* — Pearne & Gordon LLP

(57) ABSTRACT

An object is to provide, for example, a method for manufacturing an optical wavelength conversion device having a structure that enables efficient formation of crystal regions on the surface of, or inside, an amorphous material. An amorphous main body is intermittently irradiated with a first laser beam for generating a high-density excited electron region inside the main body and a second laser beam for heating the high-density excited electron region, with respective focus regions of the first and second laser beams overlapping each other. During the intermittent irradiation with the first and second laser beams, the relative position of the main body and the overlapping focus region of the first and second laser beams are varied. This enables part of the main body where the overlapping focus region moves to serve as a heat source for forming a crystal region.

6 Claims, 7 Drawing Sheets

(56) References Cited

U.S. PATENT DOCUMENTS

2018/0299616 A1 10/2018 Nagano
2019/0235164 A1* 8/2019 Triplett .............. G02B 6/02361
2019/0317380 A1 10/2019 Nagano et al.

OTHER PUBLICATIONS

Ito et al., "Ultrafast and precision drilling of glass by selective absorption of fiber-laser pulse into femtosecond-laser-induced filament", Comsol Conference 2018 Boston, pp. 061101/1-4, vol. 113, American Institute of Physics.
Fejer et al, "Quasi-Phase-Matched Second Harmonic Generation: Tuning and Tolerances", IEEE Journal of Quantum Electronics, Nov. 1992, pp. 2631-2654, vol. 28 No. 11.
Mizuuchi et al, "Broadening of the Phase-Matching Bandwidth in Quasi-Phase-Matched Second Harmonic Generation", IEEE Journal of Quantum Electronics, Jul. 1994, pp. 1596-1604, vol. 30 No. 7.
Zhu et al., "Quasi-Phase-Matched Third-Harmonic Generation in a Quasi-Periodic Optical Superlattice", Science, Oct. 1997, pp. 843-846, vol. 278.
Fujimura et al., "Tuning Bandwidth Enhancement in Waveguide Optical Second-Harmonic Generation Device Using Phase-Reversed Quasi-Phasematching Grating", Electronics and Communications in Japan, 1995, pp. 20-27, Part 2, vol. 78 No. 4.
Mao et al., "Imaging Femtosecond Laser-Induced Electronic Excitation in Glass", Applied Physics Letters, Feb. 2003, pp. 697-698, vol. 82 No. 5, American Institute of Physics.

\* cited by examiner

OPTICAL WAVELENGTH CONVERSION DEVICE AND METHOD FOR MANUFACTURING THE SAME

BACKGROUND OF THE INVENTION

1. Field of the Invention

The present invention relates to an optical wavelength conversion device and a method for manufacturing the same.

2. Description of the Related Art

Ferroelectric optical crystals, such as a $LiNbO_3$ (LN) crystal, a $KTiOPO_4$ (KTP) crystal, a $LiB_3O_5$ (LBO) crystal, and a $\beta$-$BaB_2O_4$ (BBO) crystal, are materials typically used in second-order nonlinear devices that have been developed in a wide range of application fields based on wavelength conversion. In the field of laser processing, these crystals are used to shorten the wavelengths of optical fiber lasers using second harmonic generation (SHG). Since beam spot diameters can be reduced, the crystals described above are used in fine laser processing. In the field of optical communications, the crystals described above are used in optical devices that perform simultaneous multiple wavelength conversion of C-band wavelength division multiplexing (WDM) signals to L-band WDM signals for effective use of wavelength resources of the WDM signals. In the field of measurement, where terahertz spectroscopy that enables observations of intermolecular vibrations caused by hydrogen bonding has attracted attention, the crystals described above are used in light sources that generate terahertz light. Recently, compound semiconductor crystals, such as GaAs, GaP, GaN, CdTe, ZnSe, and ZnO, have attracted attention as materials for second-order nonlinear devices, because they have large second-order nonlinear optical constants and there have been significant advances in the technology of making periodically-poled structures that are essential for second-order nonlinear devices.

Wavelength conversion techniques can be divided into two types: angle phase matching, and quasi-phase matching (QPM) based on periodic poling. In particular, the quasi-phase matching enables, by adjusting the periodic poling pitch, generation of a plurality of phase-matched wavelengths and wavelength conversion over the entire transparent region of the material. Additionally, with the quasi-phase matching, which is free from walk-off angles that are inevitable when using angle phase matching, it is possible to achieve high beam quality and increase the interaction length. The quasi-phase matching thus enables efficient use of wavelength resources and reduction of coupling loss in optical communication, and thus is an effective technique suitable for use in the fields of laser processing and measurement due to the high beam quality.

If the material used in the second-order nonlinear device is a single-crystal material, however, the wavelength conversion using the quasi-phase matching still has constraints in the forming process and requires a complex optical system. International Publication No. 2017/110792 proposes a technique that combines a flexible glass forming process with wavelength conversion. The advantage of this technique is that the substrate, which is made of glass, can be processed into various forms, such as fibers or thin films. That is, since wavelength conversion capabilities can be added to various forms of substrates, user-friendly wavelength conversion can be achieved. International Publication No. 2017/110792 described above also discloses an orientation control technique which involves aligning crystals in a region irradiated with a laser beam under application of an electric field.

As a simple and selective crystallization technique, International Publication No. 2018/123110 proposes a selective crystallization technique using laser annealing. This technique involves irradiating precursor glass with a laser beam that has a wavelength in the absorption wavelength band of the precursor glass. This laser irradiation causes local heat application resulting from absorption of light in the laser-irradiated regions, or causes local heat application to a material surface through a film coated with an absorbing material, and thus enables formation of crystal regions having local spontaneous polarizations.

SUMMARY OF THE INVENTION

The present invention provides a manufacturing method that prevents an increase in the number of manufacturing steps, involves no complex operations for optimizing manufacturing conditions and facilities, and yet offers greater flexibility in forming crystal regions on the surface of, or inside, an amorphous material to form an optical wavelength conversion device. The present invention also provides an optical wavelength conversion device obtained by the manufacturing method.

A method for manufacturing an optical wavelength conversion device according to the present disclosure includes a preparing step, a first irradiating step, a second irradiating step, and a scanning step. The preparing step prepares a main body made of an amorphous material to form an optical wavelength conversion device. The first irradiating step irradiates the main body with a first laser beam focused on the surface of, or inside, the main body and excites electrons in the focus region of the first laser beam. A femtosecond (fs) laser beam is used as the first laser beam. The fs laser beam has a wavelength outside the absorption wavelength band of the main body, or a wavelength at which the absorption of light into the main body can be kept at a low level. The second irradiating step irradiates the main body with a second laser beam focused to overlap the focus region of the first laser beam, and heats the focus region of the first laser beam. A pulsed laser beam with a pulse width of 1 picosecond (ps) or more, or a continuous wave (CW) laser beam is used as the second laser beam. Outside the focus region of the first laser beam, either the pulsed laser beam or the CW laser beam has a wavelength outside the absorption wavelength band of the main body, or has a wavelength at which the absorption of light into the main body can be kept at a low level. The scanning step varies the relative position of the main body and the overlapping focus region of the first and second laser beams while the first and second irradiating steps are being intermittently carried out in a synchronized manner.

In the present disclosure, "wavelength outside the absorption wavelength band" and "wavelength at which the absorption of light can be kept at a low level" refer to a wavelength at which the absorption coefficient is 0.01/cm or less. The focus region of the first laser beam refers to a region (high-density excited electron region) where excited electrons are present at high densities, with the focus point of the first laser beam at the center, and is defined as a region where the density of excited electrons is $10^{19}/cm^3$ or more. The state where the focus region of the first laser beam and the focus region of the second laser beam overlap not only refers to the state where the focus point of the first laser beam coincides with the focus point of the second laser beam, but also refers to the state where these focus points do not coincide. Specifically, for example, even when the focus point of the second laser beam is located outside the high-density excited electron region (i.e., outside the focus region of the first laser beam), the entire or at least part of the high-density excited electron region may be located within the region irradiated with the second laser beam.

An optical wavelength conversion device according to the present disclosure includes a main body configured to allow light to propagate therein, and a plurality of crystal regions arranged inside the main body along a propagation direction of the light. The plurality of crystal regions each have a spontaneous polarization oriented along the propagation direction (i.e., spontaneous polarization having a polarization orientation coinciding with the propagation direction).

The present disclosure enables efficient formation of crystal regions, and provides an optical wavelength conversion device capable of highly efficient wavelength conversion on the surface of, or inside, the main body of any of various shapes, such as a bulky shape and a fiber shape.

DESCRIPTION OF THE PREFERRED EMBODIMENTS

Figure 1:
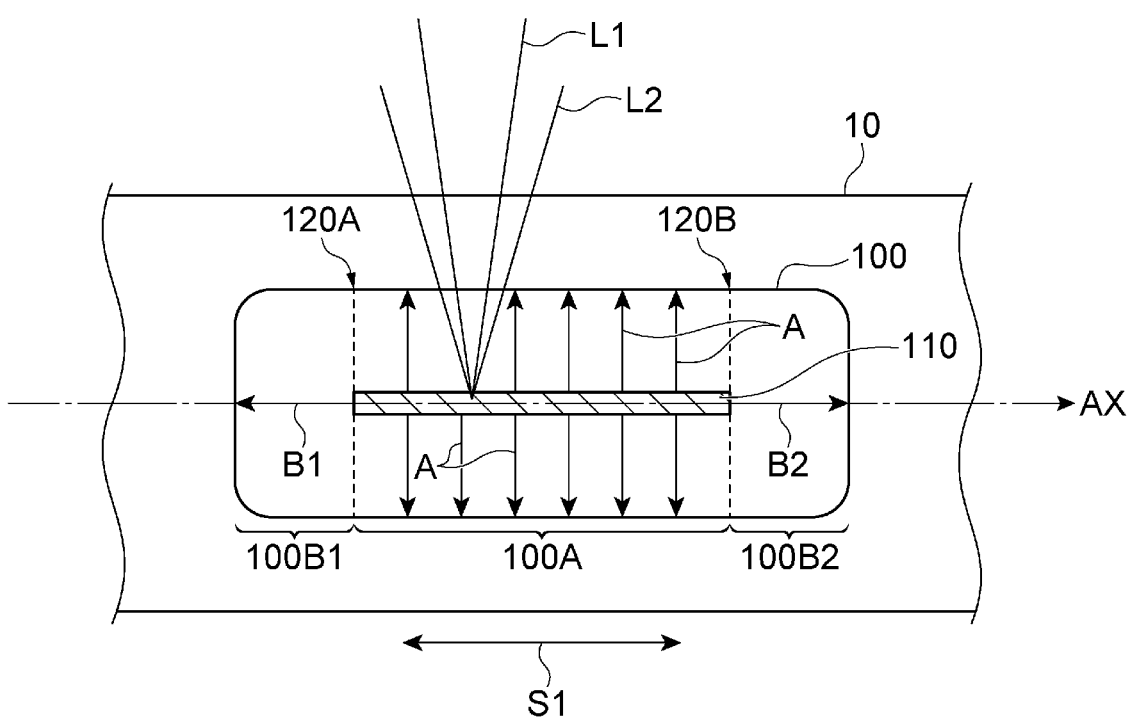
FIG. 1 is a conceptual diagram for explaining a main structure of an optical wavelength conversion device and a principle of how a crystal region is formed, according to an embodiment of the present disclosure.

An optical wavelength conversion device and a method for manufacturing the optical wavelength conversion device according to embodiments of the present invention will now be described in detail with reference to the attached drawings. Note that the present invention is not limited to the embodiments described herein. The present invention is defined by the appended claims, and all changes made within the appended claims and meanings and scopes equivalent thereto are intended to be embraced by the present invention. The same elements are denoted by the same reference numerals throughout the drawings, and redundant description will be omitted.

The technique disclosed in International Publication No. 2017/110792 involves the step of applying an electric field, and this requires preparation of electrodes. Since a voltage is applied at short intervals, a special attention needs to be paid during application of a high voltage to avoid dielectric breakdown. The technique disclosed in International Publication No. 2017/110792 thus requires many manufacturing steps and increases the difficulty of manufacture. In the technique disclosed in International Publication No. 2018/123110, the crystallization inside the material is highly dependent on the amount of light absorption. Even when the wavelength of a laser beam with which to irradiate the material is set to be short, if the material does not absorb a sufficient amount of light, it is difficult to achieve flexible formation of crystal regions inside the material only by optimizing the laser irradiation conditions and the light-condensing optical system.

Figure 2:
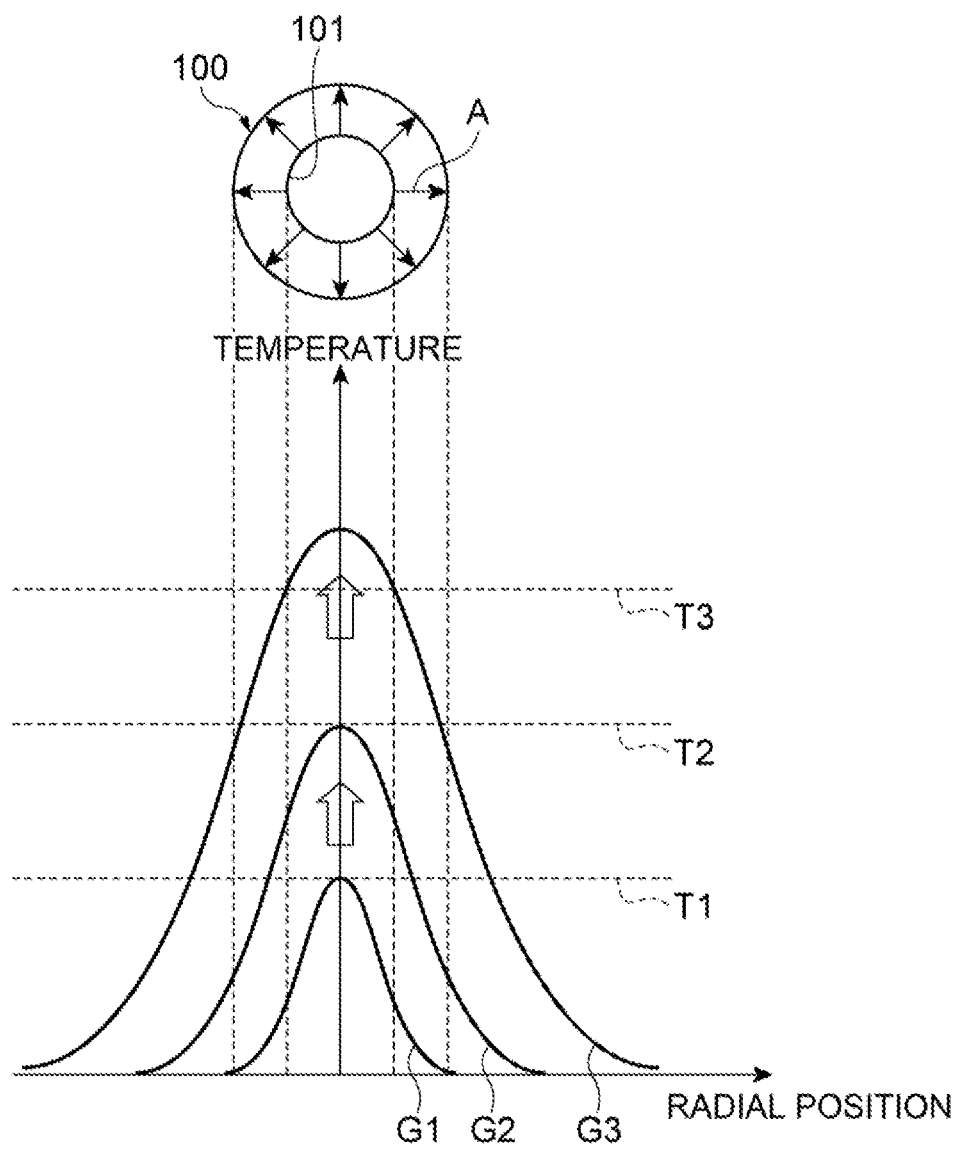
FIG. 2 is a conceptual diagram for explaining a relation between crystallization and temperature during direct laser irradiation of an amorphous material.

FIG. 1 is a conceptual diagram for explaining a main structure of an optical wavelength conversion device and a principle of how a crystal region is formed, according to an embodiment of the present disclosure. FIG. 2 is a conceptual diagram for explaining a relation between crystallization and temperature during direct laser irradiation of an amorphous material.

A method for manufacturing an optical wavelength conversion device according to the present disclosure may use a glass containing $SiO_2$ as an amorphous material for a main body to form the optical wavelength conversion device. The amorphous main body is irradiated with an fs laser beam (first laser beam) having a wavelength outside the absorption wavelength band of the main body, or a wavelength at which the level of absorption of light into the main body is low, and also with a laser beam (second laser beam) having a wavelength outside the absorption wavelength band of the main body or a wavelength at which the level of absorption of light into the main body is low. The second laser beam is either a pulsed laser beam with a pulse width of 1 ps or more, or a CW laser beam. The first laser beam and the second laser beam are applied to the main body in such a manner as to overlap in the same focus region. At this point, when the pulsed laser beam with a pulse width of 1 ps or more, or the CW laser beam, is preferentially absorbed in a high-density excited electron region temporarily generated in the focus region of the fs laser beam, heat is generated in the high-density excited electron region. The manufacturing method of the present disclosure crystallizes the neighboring region of this heated high-density excited electron region (heat-generating region), and enables flexible formation of one or more crystal regions on the surface of, or inside, the main body.

Referring to FIG. 1, a main body 10 is made of an amorphous material, and light propagates in the main body 10 along an optical axis AX. For example, if the main body 10 is a substrate having a channel waveguide structure, the optical axis of the channel waveguide coincides with the optical axis AX. Similarly, if the main body 10 is an optical fiber, the central axis of the optical fiber coincides with the optical axis AX. Materials that can be used to form the main body 10 include a $BaO$—$TiO_2$—$GeO_2$—$SiO_2$-based glass or a $SrO$—$TiO_2$—$SiO_2$-based glass. In the main body 10 made of these materials, a radially ordered polarization structure composed of fresnoite crystals ($Sr_2TiSi_2O_8$, $Ba_2TiGe_2O_8$) can be easily obtained by laser irradiation. A metal of any of the lanthanoid series, actinoid series, and group 4 to group 12 may be added to the main body 10 made of one of the materials described above. This enhances absorption of the laser beam into the main body 10, and enables more efficient formation of the ordered polarization structure.

In the present disclosure, the main body 10 is irradiated with two different types of laser beams L1 and L2 acting differently on the main body 10. The laser beam L1 (first laser beam) is applied to the main body 10 in such a manner that the focus region of the laser beam L1 is located on the surface of, or inside, the main body 10. The laser beam L1 is a laser beam for generating a high-density excited electron region 110 in the main body 10 (see, e.g., Nature Photonics 2, 219-225 (2008) by Rafael R. Gattass & Eric Mazur) and includes an fs laser beam having a wavelength outside the absorption wavelength band of the main body 10 or a wavelength at which the absorption of light into the main body 10 can be kept at a low level. Examples of the laser beam L1 include a laser beam output from a titanium-sapphire (Ti:S) laser, a laser beam output from a fiber laser (e.g., ytterbium-doped (Yb-doped) fiber laser), and a laser beam output from a wavelength conversion laser (with a wavelength of 400 nm to 550 nm) using these laser sources. All the laser beams described here are pulsed laser beams with a pulse width of 900 fs or less.

On the other hand, the laser beam L2 (second laser beam) is applied to the main body 10 in such a manner that the focus region of the laser beam L2 overlaps the focus region of the laser beam L1. The laser beam L2 is a laser beam having the function of heating the high-density excited electron region 110 of the main body 10. Outside the focus region of the laser beam L1, the laser beam L2 has a wavelength outside the absorption wavelength band of the main body 10, or has a wavelength at which the absorption of light into the main body 10 can be kept at a low level. The laser beam L2 includes a pulsed laser beam with a pulse width of 1 ps or more, or a CW laser beam. Examples of the light source for outputting the laser beam L2 include a gas laser (e.g., carbon dioxide ($CO_2$) laser), a fiber laser (e.g., Yb-doped fiber laser), and a semiconductor laser. The laser beam L2 output from any of these light sources includes a pulsed laser beam with a pulse width of 1 ps or more (preferably with a pulse width of 1 nanosecond (ns) or more), or a CW laser beam.

The high-density excited electron region 110 illustrated in FIG. 1 is a region where electrons temporarily excited by irradiation with the laser beam L1 are present at high densities. When the laser beam L2 is focused toward the high-density excited electron region 110, the optical energy of the laser beam L2 is preferentially and selectively absorbed in the high-density excited electron region 110. This optical-energy absorbing region generates heat, and functions as a heat-generating region (heat source) for forming a crystal region 100 (see, e.g., Applied Physics Letters, Vol. 113, 061101/1-4 (2018) by Yusuke Ito, et al.).

In the present disclosure, the high-density excited electron region 110 in the main body 10 is shifted along the optical axis AX by moving at least the laser beams L1 and L2 or the main body 10 in the direction indicated by arrow S1 in FIG. 1. This means that the region 110 indicated by diagonal lines in FIG. 1 is where a high-density excited electron region has been previously generated by irradiation with the laser beam L1 and has functioned as a heat-generating region in the process of formation of the crystal region 100 by absorbing the optical energy of the laser beam L2. The crystal region 100 formed in the main body 10 is a neighboring region of the high-density excited electron region 110. Specifically, the crystal region 100 is a region crystallized by heat generated in parts of the high-density excited electron region 110 during irradiation with the laser beams L1 and L2 that are moved relative to each other along the direction indicated by arrow S1.

The crystal region 100 formed as described above is composed of a first crystal sub-region 100A having a spontaneous polarization A radially orientated in the direction perpendicular to the optical axis AX, and second crystal sub-regions 100B1 and 100B2 located at both ends of the first crystal sub-region 100A along the optical axis AX. The second crystal sub-regions 100B1 and 100B2 have spontaneous polarizations B1 and B2, respectively. Unlike the spontaneous polarization A in the first crystal sub-region 100A, the spontaneous polarizations B1 and B2 are orientated along the optical axis AX (scanning direction of the laser beam L1).

The position of an interface 120A between the first crystal sub-region 100A and the second crystal sub-region 100B1 can be identified as one end of the first crystal sub-region 100A, that is, as the irradiation start position of the laser beam L1. Similarly, the position of an interface 120B between the first crystal sub-region 100A and the second crystal sub-region 100B2 can be identified as the other end of the first crystal sub-region 100A, that is, as the irradiation end position of the laser beam L1.

Particularly in the optical wavelength conversion device of the present disclosure, a plurality of crystal regions 100, each having the structure illustrated in FIG. 1, are arranged along the optical axis AX in the main body 10. In the plurality of crystal regions 100 arranged along the optical axis AX in the main body 10, the interfaces 120A and 120B, which define the positions of both ends of each first crystal sub-region 100A, are alternately arranged along the optical axis AX. When the plurality of crystal regions 100 are arranged in the main body 10, an interval between interfaces 120A in two adjacent ones of the crystal regions 100 along the optical axis AX, or an interval between interfaces 120B in two adjacent ones of the crystal regions 100 along the optical axis AX, is defined as one period of the repetitive structure. This repetitive structure preferably has a constant period, a chirp period, a period including a plurality of different constant periods, or a period based on a Fibonacci sequence or Barker sequence.

The amount of heat generation in the region where the optical energy of the laser beam L2 is absorbed (absorption region) is dependent on the duration of irradiation with the laser beam L2. As the amount of heat generation increases, the temperature in the neighboring region around the absorption region also increases (from a crystal nucleation threshold T1 to a crystal growth threshold T2 as shown in FIG. 2). The neighboring region can be crystallized by controlling the amount of heat generation in the absorption region such that the temperature in the neighboring region is lower than or equal to a damage (or melting) threshold T3.

FIG. 2 is a diagram for explaining a relation between crystallization and temperature during direct laser irradiation of an amorphous material, which is a typical example of laser irradiation. The crystal region 100 illustrated in FIG. 2 coincides with a cross-section of the main body 10 orthogonal to the optical axis AX illustrated in FIG. 1. The crystal region 100 has the spontaneous polarization A radially oriented as illustrated in FIG. 2. Curves G1 to G3 in FIG. 2 indicate that when an amorphous material (target) is irradiated with a laser beam, the temperature in the irradiated region is highest on the optical axis of the laser beam, and decreases with increasing distance from the optical axis of the laser beam in the radial direction.

At the stage of curve G1, only the center temperature in the irradiated region has reached the crystal nucleation threshold T1 and the temperature in the other region has not yet reached the crystal nucleation threshold T1. Crystal nuclei are formed only in the center of the irradiated region, and the spontaneous polarization is randomly oriented at this point.

As continuous or intermittent laser irradiation continues, the overall temperature distribution rises and the center temperature in the irradiated region reaches the crystal growth threshold T2 as indicated by curve G2. This allows the crystals to start growing at the crystal nuclei. The crystals grow in accordance with the random orientation of the spontaneous polarization. The crystal nuclei growing toward the center of the irradiated region collide with each other and stop growing. This makes the orientation toward the outer region where the crystals can grow dominant. Therefore, the final orientation of the spontaneous polarization A is mainly away from the center of the irradiated region (i.e., from the optical axis of the laser beam) along the radial direction.

The continuous or intermittent laser irradiation continues, and when the temperature in and around the center of the irradiated region exceeds the damage threshold T3 as indicated by curve G3, the target melts in and around the center. This means that a perforation (processing mark) 101 is formed in the center of the crystal region. The crystal region 100 having an annular shape is thus formed, which has the spontaneous polarization A oriented radially.

Figure 3:
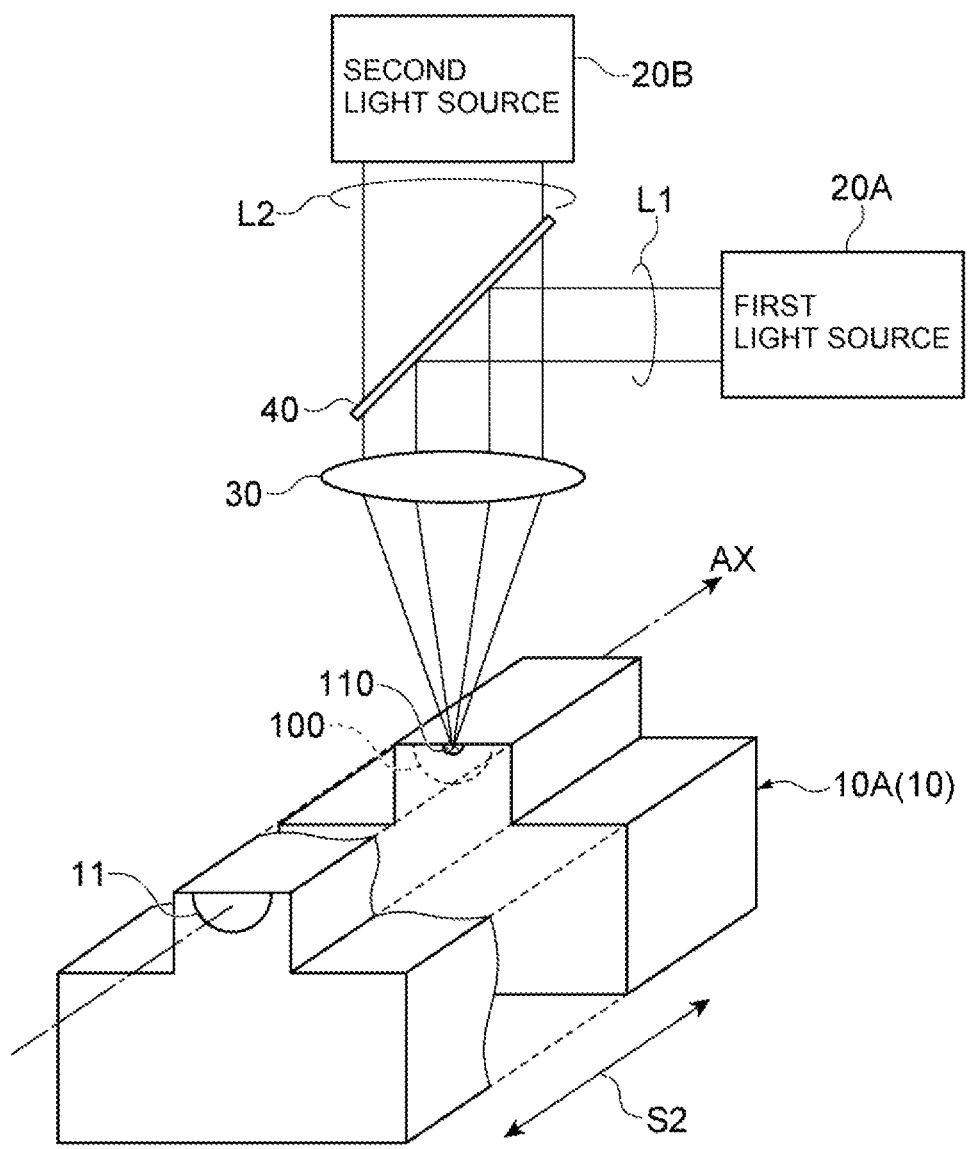
FIG. 3 is a conceptual diagram for explaining a method for manufacturing an optical wavelength conversion device according to the present disclosure.

FIG. 3 is a conceptual diagram for explaining a method for manufacturing an optical wavelength conversion device according to the present disclosure. As the main body 10, a waveguide substrate 10A having a channel waveguide 11 extending along the optical axis AX is prepared (preparing step). A first light source 20A outputs the laser beam L1 (fs laser beam) for generating a high-density excited electron region on the surface of, or inside, the waveguide substrate 10A, and the waveguide substrate 10A is irradiated with the laser beam L1 (first irradiating step). A second light source 20B outputs the laser beam L2 (which is a pulsed laser beam with a pulse width of 1 ps or more, or a CW laser beam) for heating part of the waveguide substrate 10A, and the waveguide substrate 10A is irradiated with the laser beam L2 (second irradiating step). The laser beam L1 and the laser beam L2 are coaxially applied to the waveguide substrate 10A. That is, the optical path of the laser beam L1, extending from the first light source 20A to the waveguide substrate 10A, and the optical path of the laser beam L2, extending from the second light source 20B to the waveguide substrate 10A, are provided with a light-condensing optical system 30 and a half mirror 40 that are shared by the laser beams L1 and L2. This coaxial irradiation system is advantageous in that it can be configured easily.

The first irradiating step and the second irradiating step are carried out in a synchronized manner to enable intermittent irradiation with the laser beam L1 and the laser beam L2. During the laser irradiation, the laser beam L1 output from the first light source 20A is reflected by the half mirror 40 toward the light-condensing optical system 30. After passing through the light-condensing optical system 30, the laser beam L1 is focused near the surface of the waveguide substrate 10A. The high-density excited electron region 110 is generated in the focus region of the laser beam L1. At the same time, the laser beam L2 output from the second light source 20B travels through the half mirror 40 toward the light-condensing optical system 30. After passing through the light-condensing optical system 30, the laser beam L2 is focused to overlap the high-density excited electron region 110. The optical energy of the laser beam L2 is efficiently absorbed in the high-density excited electron region 110, which functions as a heat-generating region to form the crystal region 100 in the channel waveguide 11.

While the first and second irradiating steps are being intermittently carried out in a synchronized manner, at least the waveguide substrate 10A or the coaxial irradiation system for the laser beams L1 and L2 moves along the direction indicated by arrow S2. This enables a plurality of crystal regions 100 to be formed along the optical axis AX of the channel waveguide 11 in the waveguide substrate 10A (scanning step).

The crystal regions 100 are formed by one scan in this example, but may be formed by multiple scans. In the latter case, the initial scan involves using the laser beam L2 with lower power to form crystal nuclei at the stage of curve G1 in FIG. 2, and the subsequent scans involve using the laser beam L2 with higher power to enable the crystal nuclei to grow at the stage of curve G2 or G3 in FIG. 2. The channel waveguide 11 may be formed in the waveguide substrate 10A before the first and second irradiating steps, or may be formed in the waveguide substrate 10A after the scanning step (processing step). The channel waveguide 11 having a ridge structure may be formed by dry etching or may be cut out by a dicing saw.

Figure 4:
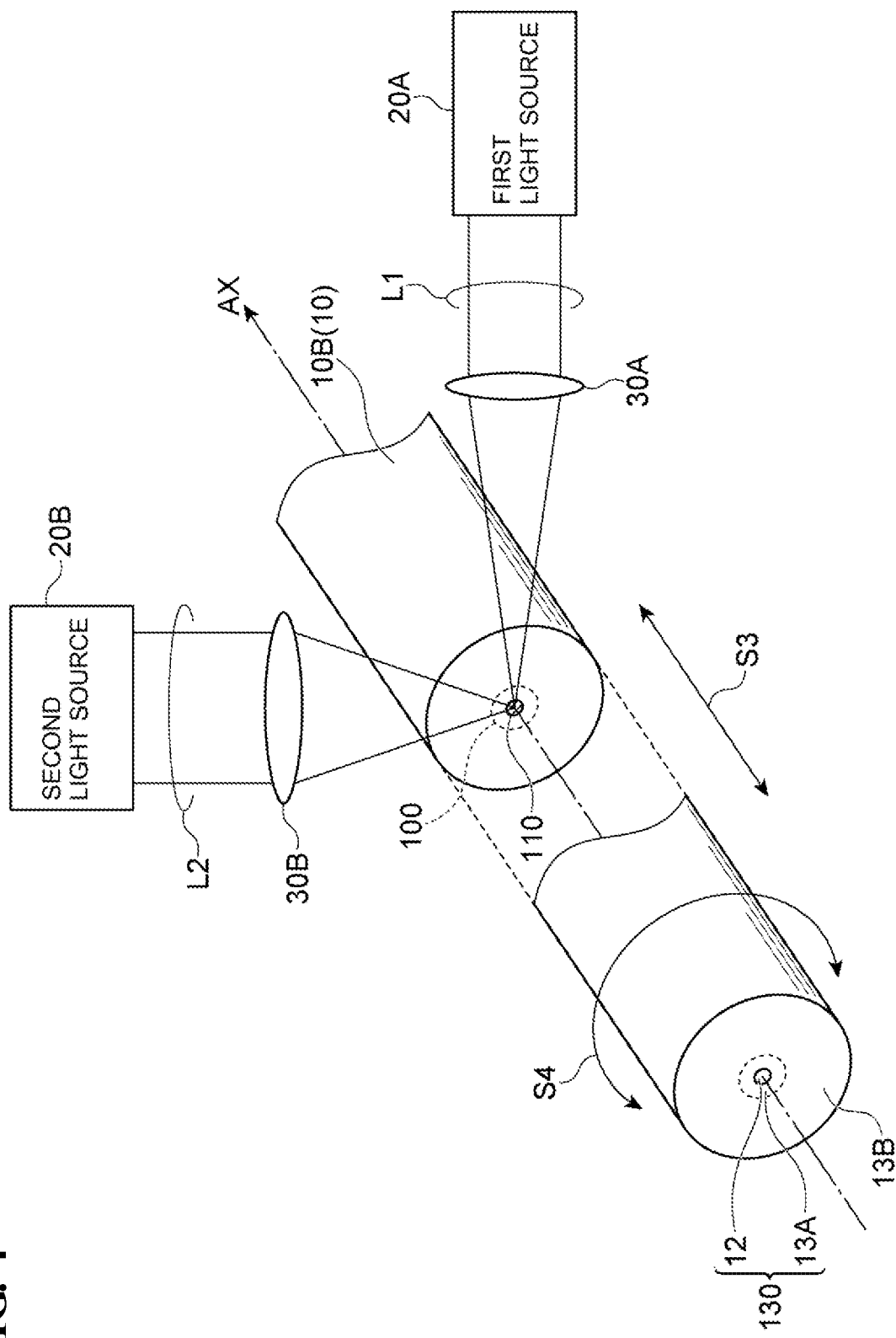
FIG. 4 is a conceptual diagram for explaining another method for manufacturing an optical wavelength conversion device according to the present disclosure.

FIG. 4 is a conceptual diagram for explaining another method for manufacturing an optical wavelength conversion device according to the present disclosure. In this example, an optical fiber 10B having a central axis extending along the optical axis AX is prepared as the main body 10 (preparing step). The optical fiber 10B includes a core 12 containing and extending along the central axis (which coincides with the optical axis AX), an optical cladding 13A surrounding the core 12, and a physical cladding (jacket) 13B surrounding the optical cladding 13A. In the optical fiber 10B structured as described above, the crystal region 100 is formed in at least part of an optical waveguide region 130 including the core 12 and the optical cladding 13A. Specifically, a plurality of crystal regions 100 are formed in the core 12 (i.e., in the entire or part of the core 12), in the optical cladding 13A (i.e., in the entire or part of the optical cladding 13A), in a region including part of the core 12 and part of the optical cladding 13A, or in a region including the entire core 12 and the entire optical cladding 13A.

The first light source 20A outputs the laser beam L1 (fs laser beam) for generating the high-density excited electron region 110 inside the optical fiber 10B, and the optical fiber 10B is irradiated with the laser beam L1 (first irradiating step). The second light source 20B outputs the laser beam L2 (which is a pulsed laser beam with a pulse width of 1 ps or more, or a CW laser beam) for heating the high-density excited electron region 110 in the optical fiber 10B, and the optical fiber 10B is irradiated with the laser beam L2 (second irradiating step). In the example illustrated in FIG. 4, the laser beam L1 and the laser beam L2 propagate along different optical paths to reach the interior of the optical fiber 10B. That is, a light-condensing optical system 30A is disposed in the optical path of the laser beam L1 extending from the first light source 20A to the optical fiber 10B, and a light-condensing optical system 30B is disposed in the optical path of the laser beam L2 extending from the second light source 20B to the optical fiber 10B.

As in the example illustrated in FIG. 3, the first irradiating step and the second irradiating step are carried out in a synchronized manner to enable intermittent irradiation with the laser beam L1 and the laser beam L2. During the laser irradiation, the laser beam L1 output from the first light source 20A passes through the light-condensing optical system 30A and is focused inside the optical fiber 10B. The high-density excited electron region 110 is generated in the focus region of the laser beam L1. At the same time, the laser beam L2 output from the second light source 20B passes through the light-condensing optical system 30B and is focused to overlap the high-density excited electron region 110. The optical energy of the laser beam L2 is efficiently absorbed in the high-density excited electron region 110, which functions as a heat-generating region to form the crystal region 100 in the optical fiber 10B. The crystal region 100 is controlled in the same manner as in the example illustrated in FIG. 3.

By intermittently carrying out the first and second irradiating steps in a synchronized manner along the direction indicated by arrow S3, a plurality of crystal regions 100 are formed along the central axis (optical axis AX) of the optical fiber 10B (scanning step). By focusing the laser beam L1 at a position off the central axis and rotating the optical fiber 10B in the direction indicated by arrow S4 in FIG. 4, the crystal regions 100 annular in cross-section can be obtained in the optical waveguide region 130.

When one irradiation system composed of the first light source 20A and the light-condensing optical system 30A and the other irradiation system composed of the second light source 20B and the light-condensing optical system 30B are moved with respect to the optical fiber 10B, XYZ-axis stages that hold the respective irradiation systems are moved in a synchronized manner. The two irradiation systems in the example illustrated in FIG. 4 offer greater flexibility in laser irradiation, because they allow changes in the focusing conditions of the first and second light sources 20A and 20B. That is, the focusing conditions of the laser beam L2 can be changed in accordance with the depth of the focus point of the laser beam L1. A mechanism may be added to any of the examples to synchronize the pulse irradiation of the laser beam La and the laser beam L2 at the focus point (though this mechanism is unnecessary if the laser beam L2 is a CW laser beam). Also, in any of the examples, the intensities of the laser beams L1 and L2 can be adjusted in accordance with the irradiated region.

Figure 5:
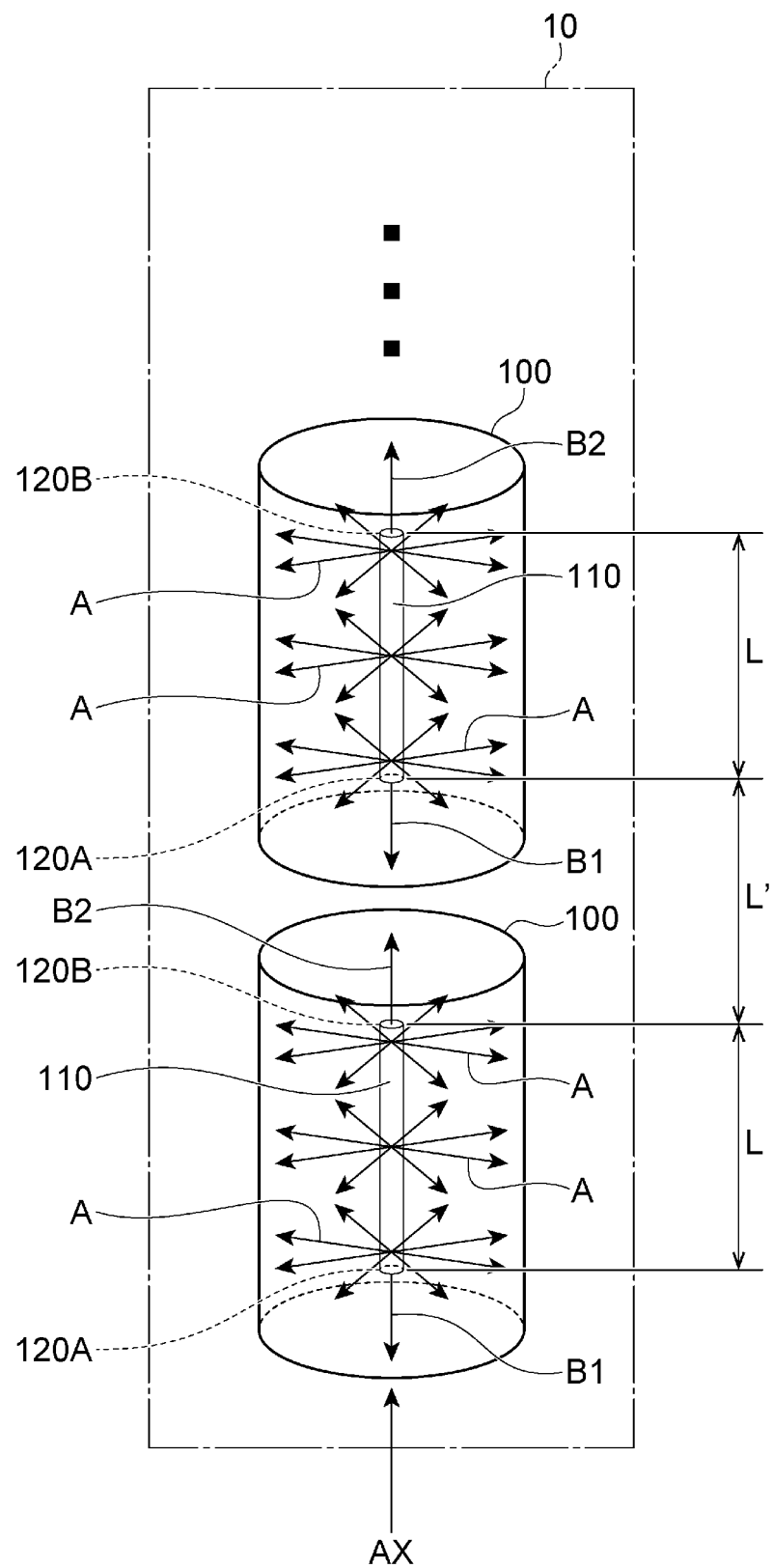
FIG. 5 is a conceptual diagram illustrating, as an example of the optical wavelength conversion device according to the present disclosure, a repetitive structure where a plurality of crystal regions are arranged alternately with amorphous regions in a main body.

FIG. 5 is a conceptual diagram illustrating, as an example of the optical wavelength conversion device according to the present disclosure, a repetitive structure where a plurality of crystal regions are arranged alternately with amorphous regions therebetween in the main body 10. In the example illustrated in FIG. 5, adjacent ones of the crystal regions 100 arranged along the optical axis AX are spaced apart, with an amorphous region therebetween. Note that FIG. 5 conceptually illustrates the crystal regions 100 obtained after a substrate is irradiated, in an overlapping manner, by an fs laser and a heat-generating laser with appropriate pulse widths, optical intensities, repetition frequencies, focusing conditions, and wavelengths.

A cylindrical portion in the center of each crystal region 100 is the high-density excited electron region 110 generated by irradiation with the laser beam L1. By irradiating the high-density excited electron region 110 with the laser beam L2 in an overlapping manner, the temperature in the neighboring region increases from T1 to T2 as in FIG. 2. This enables the crystal region 100 reflecting the shape of the high-density excited electron region 110 to be formed around the high-density excited electron region 110. The crystal region 100 is cylindrical in the example illustrated in FIG. 5. More precisely, however, the crystal region 100 is crystallized in a long egg shape, as its shape is dependent on the shape of the high-density excited electron region 110 that reflects the focusing conditions.

In the center portion of the cylinder representing the crystal region 100 (corresponding to the first crystal sub-region 100A in FIG. 1), the spontaneous polarization A radially oriented about the optical axis AX is generated. The end portions of the crystal region 100 (corresponding to the second crystal sub-regions 100B1 and 100B2 in FIG. 1) have the respective spontaneous polarizations B1 and B2 oriented in opposite directions along the optical axis AX. More precisely, each spontaneous polarization is oriented in a direction reflecting the shape of the high-density excited electron region 110, that is, in a direction perpendicular to the tangent to the boundary between the high-density excited electron region 110 and its neighboring region.

In the example of FIG. 5, the plurality of crystal regions 100 are arranged with a period which is the sum of a length L of the high-density excited electron region 110 and a distance L' between adjacent ones of the high-density excited electron regions 110. Specifically, L is determined by the distance between the interface 120A and the interface 120B within one crystal region 100, and L' is determined by the distance between the interface 120B within one of two adjacent crystal regions 100 and the interface 120A within the other of the two adjacent crystal regions 100. That is, the plurality of crystal regions 100 along the optical axis AX are arranged with a period of L+L', and this enables high-efficiency wavelength conversion using quasi-phase matching.

To extend the phase matching band, for example, any of the following structures may be employed as the aforementioned repetitive structure: an aperiodic periodically-poled structure (or chirp period described in IEEE J. Quantum Electron., Vol. 28, 2631-2654 (1992) by Martin M. Fejer, et al.), a structure where multiple types of periodic regions (e.g., period Λ1 region, period Λ2 region, and period Λ3 region) are treated as one segment and a plurality of such segments are arranged at given intervals (see, IEEE J. Quantum Electron., Vol. 30, 1596-1604 (1994) by Kiminori Mizuuchi, et al.), a periodic structure based on a Fibonacci sequence (see, Science, Vol. 278, 843-846 (1997) by Shining Zhu, et al.), and a periodic structure based on a Barker sequence (see, Electronics and Communications in Japan, Part 2, Vol. 78, 20-27 (1995) by Masatoshi Fujimura, et al.).

An optical device including the main body 10 illustrated in the example of FIG. 5 receives light that is incident along the optical axis AX. The incident light is preferably a radially polarized vector beam. The spontaneous polarization B1 and the spontaneous polarization B2 coincide with the propagation direction of the light along the optical axis AX. The nonlinear optical constant (d) is, for example, d16 or d22. However, since the nonlinear optical constant of the main body 10, which is a tetragonal system, is zero, unnecessary wavelength conversion does not take place. High-efficiency wavelength conversion is thus achievable.

Figure 6:
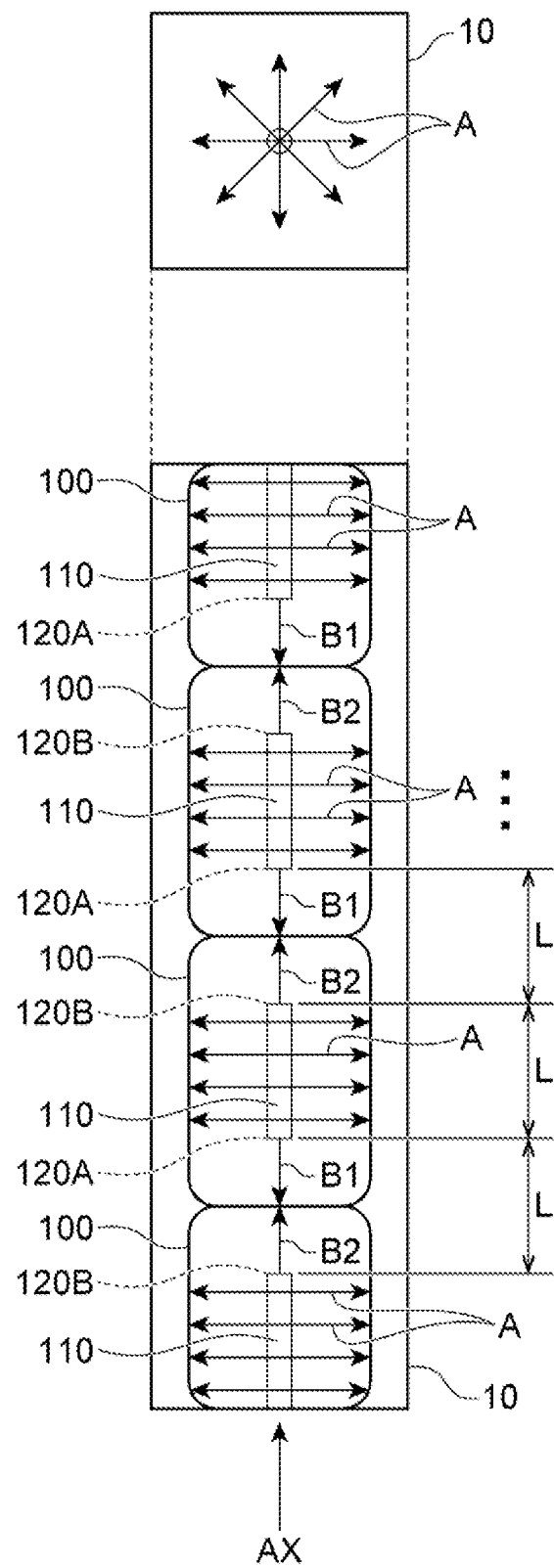
FIG. 6 is a conceptual diagram illustrating, as another example of the optical wavelength conversion device according to the present disclosure, a repetitive structure where a plurality of crystal regions are continuously arranged in the main body.
Figure 7:
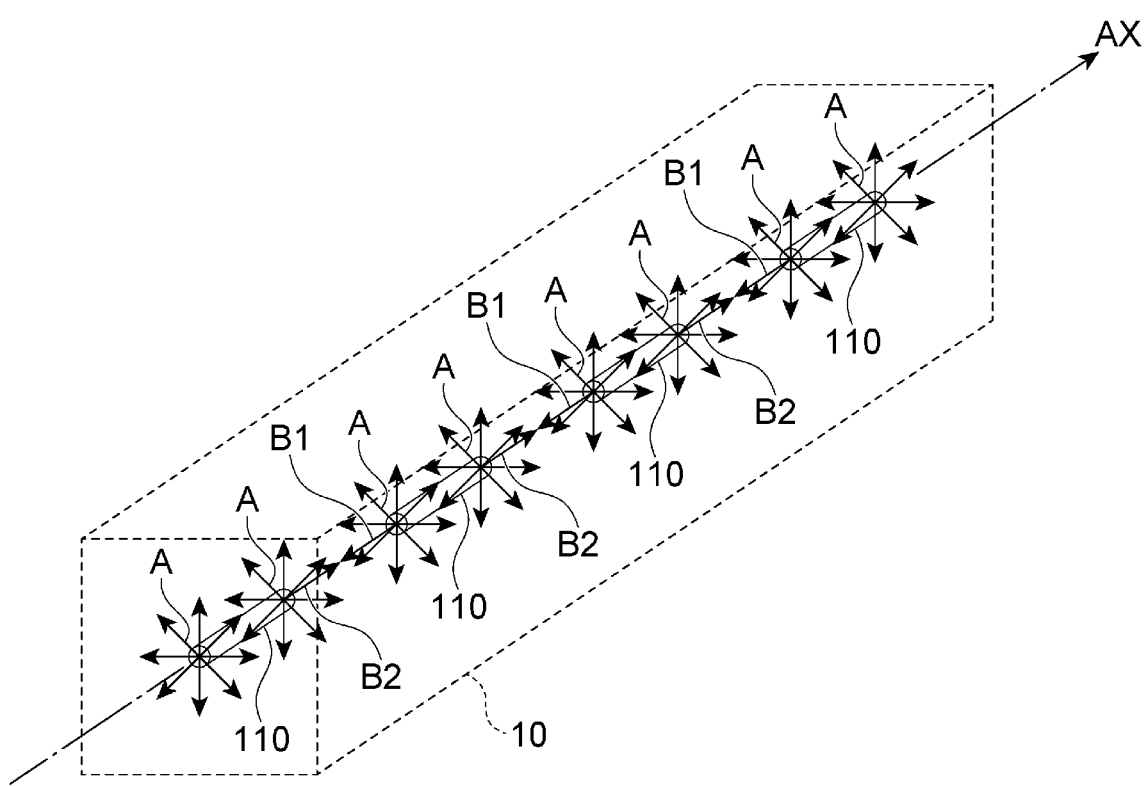
FIG. 7 is a conceptual diagram for explaining the order of polarizations in the structure illustrated in FIG. 6.

FIG. 6 is a conceptual diagram illustrating, as another example of the optical wavelength conversion device according to the present disclosure, a repetitive structure where a plurality of crystal regions are continuously arranged in the main body 10. Specifically, FIG. 6 illustrates a lateral structure and a front structure of the main body 10. FIG. 7 is a perspective view illustrating the orientations of spontaneous polarizations formed inside the main body 10 in the structure illustrated in FIG. 6. In the example illustrated in FIG. 6 and FIG. 7, adjacent ones of the plurality of crystal regions 100 along the optical axis AX are arranged, with portions thereof having the spontaneous polarizations B1 and B2 in contact with each other.

In the example of FIG. 6 and FIG. 7, the overall structure of the crystal regions 100 is the same as that in the example of FIG. 5, and the repetitive structure has a constant period of 2L, where L is the distance between the interfaces 120A and 120B. The distance L is the coherence length of quasi-phase matching. However, regardless of whether the crystal regions 100 are in contact, or are spaced apart with an amorphous region left between adjacent ones of the crystal regions 100 as in the example of FIG. 5, the refractive indices of the crystal regions 100 and the amorphous regions are unchanged. That is, since such arrangement has no impact on the wavelength conversion, adjacent ones of the crystal regions 100 may be either in contact or spaced apart.

Although the crystal regions 100 are formed inside the main body 10 in the example of FIG. 6 and FIG. 7, the high-density excited electron regions 110 may be exposed at the surface of the main body 10 as in the example of FIG. 3. By focusing the laser beams L1 and L2 on this surface, a crystal region semicircular in cross-section is formed. In this case, the spontaneous polarization is radially orientated in the cross-section. High-efficiency wavelength conversion is still achievable here, when a plurality of crystal regions 100 are linearly arranged such that adjacent interfaces are spaced L apart and, at the same time, the main body 10 is processed into a ridge shape in such a manner as to be parallel to the direction in which quasi-phase matching is established (i.e., direction along the optical axis AX).

The crystal regions 100 may be formed into any shape, regardless of whether the main body 10 is bulky, plate-shaped, or fiber-shaped. Also, in the optical fiber 10B illustrated in the example of FIG. 4, any of the core 12, the optical cladding 13A, and the physical cladding 13B may be made of the material (at least one of $BaO$—$TiO_2$—$GeO_2$—$SiO_2$-based glass or $SrO$—$TiO_2$—$SiO_2$-based glass) used to form the main body 10 illustrated in FIG. 1. A metal of any of the lanthanoid series, actinoid series, and group 4 to group 12 may be added to the entire or part of the optical waveguide region 130 including the core 12 and the optical cladding 13A. In any of the cases described above, by irradiating with the laser beam L1 (fs laser beam) and the laser beam L2 (pulsed laser beam or CW laser beam) in such a manner that their focus regions overlap, a heat-generating region can be preferentially formed and a crystal region is formed using the heat from the heat-generating region. Also, intermittent laser irradiation of the main body 10 enables intermittent formation of crystal regions (i.e., formation of a plurality of crystal regions arranged along the optical axis).

What is claimed is:

1. A method for manufacturing an optical wavelength conversion device, comprising:
    a preparing step of preparing a main body made of an amorphous material;
    a first irradiating step of irradiating the main body with a first laser beam focused on a surface of or inside the main body and exciting electrons in a focus region of the first laser beam, the first laser beam being a femtosecond laser beam having a wavelength outside an absorption wavelength band of the main body;
    a second irradiating step of irradiating the main body with a second laser beam focused to overlap the focus region of the first laser beam and heating the focus region of the first laser beam, the second laser beam being a continuous wave laser beam or a pulsed laser beam with a pulse width of one picosecond or more, the second laser beam being a laser beam having, outside the focus region of the first laser beam, a wavelength outside the absorption wavelength band of the main body; and
    a scanning step of varying a relative position of the main body and an overlapping focus region of the first and second laser beams while the first and second irradiating steps are being intermittently carried out in a synchronized manner.

2. The method according to claim 1, wherein
the main body is made of $BaO$—$TiO_2$—$GeO_2$—$SiO_2$-based glass or $SrO$—$TiO_2$—$SiO_2$-based glass.

3. The method according to claim 2, wherein
the main body includes a metal of any of the lanthanoid series, actinoid series, and group 4 to group 12 as an additive.

4. The method according to claim 1, wherein
the first laser beam includes any of a laser beam output from a titanium-sapphire laser, a laser beam obtained by converting a wavelength of the laser beam output from the titanium-sapphire laser, a laser beam output from a ytterbium-doped fiber laser, and a laser beam obtained by converting a wavelength of the laser beam output from the ytterbium-doped fiber laser.

5. The method according to claim 1, wherein
the second laser beam includes a laser beam output from any of a carbon dioxide laser, an ytterbium-doped fiber laser, and a semiconductor laser.

6. The method according to claim 1, further comprising
a processing step of forming a channel waveguide structure in the main body before the first and second irradiating steps or after the scanning step, the channel waveguide structure having an optical axis extending along a direction in which the overlapping focus region of the first and second laser beams moves.

* * * * *